2,954,391
PREPARATION OF BIS(HEPTAHYDROCARBON-CYCLOTETRASILOXANYL) OXIDES

David W. Riley, Kenmore, N.Y., and Robert Y. Mixer, Palo Alto, Calif., assignors to Union Carbide Corporation, a corporation of New York No Drawing. Filed Dec. 30, 1958, Ser. No. 783,697

9 Claims. (Cl. 260—448.2)

This invention relates to organosilicon compounds and processes for their production.

This invention provides bis(heptahydrocarboncyclotetrasiloxanyl)oxides which are represented by the formula:

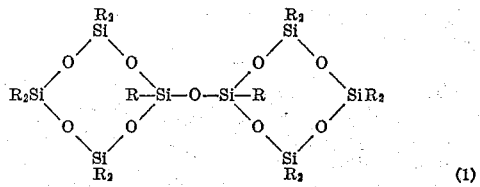
(1)

wherein R is a monovalent hydrocarbon group such as an alkyl group (e.g. a methyl, ethyl or a propyl group), or an aryl group (e.g. a phenyl group), or an aralkyl group (e.g. a beta-phenylethyl group) or a cycloalkyl group (e.g. a cyclohexyl group). Preferably R is an alkyl group containing from 1 to 4 carbon atoms. In Formula 1, R can be the same or different.

This invention further provides a process for producing bis(heptahydrocarboncyclotetrasiloxanyl)oxides (hereinafter denoted as the "metathesis process") which involves forming a mixture of a heptahydrocarbonhalocyclotetrasiloxane and a heptahydrocarbonhydroxycyclotetrasiloxane and maintaining the mixture at a temperature at which the heptahydrocarbonhalocyclotetrasiloxane and the heptahydrocarbonhydroxycyclotetrasiloxane react to produce a bis(heptahydrocarboncyclotetrasiloxanyl)oxide. The metathesis process involves a reaction that can be represented by the equation:

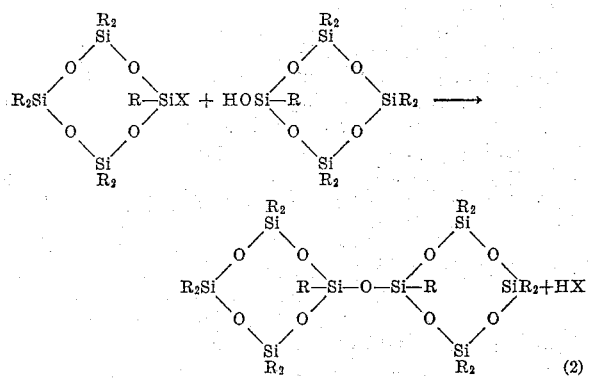
(2)

wherein X is a halogen atom (e.g. chlorine or bromine) and R has the above-defined meaning. Preferably X is a bromine atom.

This invention still further provides another process for producing bis(heptahydrocarboncyclotetrasiloxanyl)-oxides (hereinafter denoted as the "condensation process") which involves condensing heptahydrocarbonhydroxycyclotetrasiloxanes. The condensation process involves a reaction that can be represented by the equation:

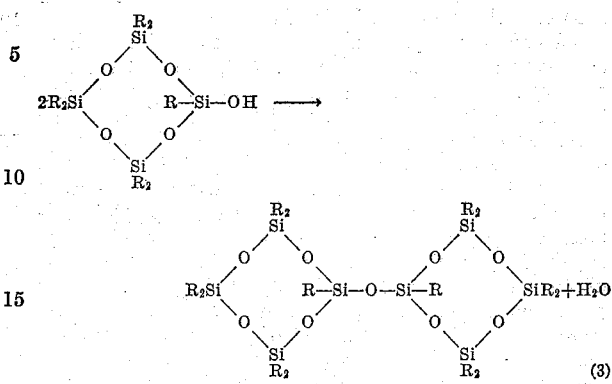
(3)

Heptahydrocarbonhalocyclotetrasiloxanes are produced by a process that involves forming a mixture of a heptahydrocarboncyclotetrasiloxane and a halogenating agent and maintaining the mixture at a temperature at which heptahydrocarboncyclotetrasiloxane and the halogenating agent react to produce a heptahydrocarbonhalocyclotetrasiloxane. Suitable halogenating agents are the N-halosuccinimides (e.g. N-chlorosuccinimide and N-bromosuccinimide), N-bromophthalamide, N-bromoacetamide and the like. The preferred halogenating agent is N-bromosuccinimide. Preferably a slight excess of the halogenating agent is used (e.g. about 10% above the stoichiometric amount) to insure complete reaction of the heptahydrocarboncyclotetrasiloxane. Other amounts can be used but no particular advantage is gained thereby.

The heptahydrocarboncyclotetrasiloxane and the halogenating agent is preferably dissolved in a suitable solvent and the heptahydrocarbonhalocyclotetrasiloxane formed therein. Suitable solvents include carbon tetrachloride, chloroform, benzene and the like. The preferred solvent is carbon tetrachloride.

The heptahydrocarboncyclotetrasiloxane and the halogenating agent can be caused to react to produce the heptahydrocarbonhalocyclotetrasiloxane by maintaining them at a temperature from 20° C. to 80° C. or preferably from 20° C. to 40° C. No advantage is gained by employing other temperatures although such other temperatures can be used, if desired.

Heptahydrocarboncyclotetrasiloxanes can be produced by cohydrolyzing and cocondensing mixtures of dihydrocarbondichlorosilanes (i.e. $R_2SiCl_2$) and hydrocarbondichlorosilanes (i.e. $RSiHCl_2$). Such mixtures should contain three moles of $R_2SiCl_2$ per mole of $RSiHCl_2$. Known cohydrolysis and cocondensation procedures can be used in the production of heptahydrocarboncyclotetrasiloxanes.

Heptahydrocarbonhydroxycyclotetrasiloxanes can be produced by hydrolyzing heptahydrocarbonhalocyclotetrasiloxanes. The hydrolysis can be conducted by forming a mixture of a heptahydrocarbonhalocyclotetrasiloxane and water. The hydrolysis occurs spontaneously at room temperature to produce a heptahydrocarbonhydroxycyclotetrasiloxane and a hydrogen halide. A strong base can be added to the mixture to neutralize the acid so formed.

Solvents for the reactants, such as carbon tetrachloride, benzene, toluene, chloroform, can be used in the metathesis process for producing bis(heptahydrocarboncyclotetrasiloxanyl)oxides. The preferred solvent is carbon tetrachloride. The amount of solvent used can vary from 250 parts to 100 parts by weight or preferably from 250 parts to 500 parts by weight per 100 parts by weight of the reactants. The temperature used can be from 0° C. to 100° C. but it is preferably from 20° C. to 40° C. Stoichiometric amounts of the reactants are preferred. No particular advantage is gained by employing other temperatures or other than the indicated amounts of solvent and reactants. The hydrogen halide formed in the metathesis process is conveniently removed by adding a base, such as sodium hydroxide.

Solvents for heptahydrocarbonhydroxycyclotetrasiloxane, such as toluene, carbon tetrachloride and the like can be used in the condensation process for producing bis (heptahydrocarboncyclotetrasiloxanyl) oxides. The preferred solvent is carbon tetrachloride. The amount of the solvent used can vary from 500 parts to 1000 parts by weight or preferably from 900 parts to 1000 parts by weight per 100 parts by weight of the heptahydrocarbonhydroxycyclotetrasiloxane. No particular advantage is gained by employing other than the indicated amounts of solvent. Basic catalysts (e.g. potassium hydroxide or potassium dimethylsilanolate in an amount that provides from 30 to 100 parts by weight of potassium per million parts by weight of the heptahydrocarbonhydroxycyclotetrasiloxane) are used in the condensation process. The temperature used can be from 35° C. to 100° C. but it is preferably from 60° C. to 80° C. Higher temperatures are not desirable since equilibration reactions occur to produce undesirable by-products.

Bis (heptahydrocarboncyclotetrasiloxanyl) oxides can be equilibrated with other organosilicon compounds in order to incorporate trifunctional siloxane groups (i.e.

$RSiO_{1.5}$ groups) therein. By way of illustration, bis(heptamethylcyclotetrasiloxanyl)oxide can be equilibrated with dimethylsiloxane cyclic tetramer to produce a gum having improved green strength owing to the presence of the $MeSiO_{1.5}$ groups provided by the bis(heptamethylcyclotetrasiloxanyl)oxide. These gums are more amenable to extrusion prior to curing than conventional dimethylpolysiloxane gums. Such gums can be converted to excellent silicone elastomers.

The following examples illustrate the present invention:

Example I

Heptamethylcyclotetrasiloxane (30 g.) was dissolved in carbon tetrachloride (100 cc.) and N-bromosuccinimide (21 g.–10% excess) was added in one gram portions while stirring the solution. The addition was performed at room temperature and there was so produced an orange solution containing heptamethylbromocyclotetrasiloxane. Infrared analysis showed that no silanic hydrogen was present in the solution. The solution was divided into two equal portions.

One portion of the orange solution was mixed with water (100 cc.) at room temperature. Two phases formed, a water phase and a carbon tetrachloride phase. Hydrogen bromide was formed and was neutralized by adding 60 cc. of a 1.5 N NaOH solution in small increments. The carbon tetrachloride phase containing heptamethylhydroxycyclotetrasiloxane was separated from the water. This phase was stable, colorless, clear and neutral.

The remaining half of the orange solution and the solution containing heptamethylhydroxycyclotetrasiloxane were mixed at room temperature. Hydrogen bromide was formed and was neutralized with 30 cc. of 1.5 N NaOH. The mixture was refluxed for 30 minutes and then the carbon tetrachloride layer was separated from the water layer, washed with water, dried over anhydrous, posassium carbonate and fractionally distilled at 20 to 22 microns pressure to separate bis(heptamethylcyclotetrasiloxanyl)oxide.

The bis(heptamethylcyclotetrasiloxanyl)oxide so produced was analyzed and the following results were obtained:

| Property | Observed | Theoretical |
| --- | --- | --- |
| Molecular weight (freezing point) | 569±57 | 579 |
| Carbon (weight-percent) | 29.2±0.5 | 29.1 |
| Hydrogen (weight-percent) | 7.1±0.3 | 7.3 |
| Silicon (weight-percent) | 38.0±0.5 | 38.8 |

Example II

A mixture was formed containing 198 g. of dimethylsiloxane cyclic tetramer, 0.200 g. of bis(heptamethylcyclotetrasiloxanyl)oxide and 2.00 g. of a linear ethoxy endblocked dimethylpolysiloxane containing 2 wt.-percent ethoxy groups. The mixture was heated to 150° C. in an atmosphere of nitrogen and potassium dimethylsilanolate (containing 30 parts per million of potassium) was added. The mixture was stirred for 5 minutes, then covered and put in an air draft oven for about 2.5 hours at 150° C. There was so produced a gum that was soluble in toluene and that had better green strength (i.e. ability to be stretched without tearing prior to curing) than conventional dimethylpolysiloxane gums. The gum contained 230 parts per million of $MeSiO_{1.5}$ groups derived from the starting bis(heptamethylcyclotetrasiloxanyl)oxide.

Example III

The gum produced in Example II (100 parts by weight) was mixed with finely divided silica (35 parts by weight) and benzoyl peroxide (2 parts by weight) and cured in a mold at 250° F. for 15 minutes. The elastomer so produced was postcured by heating at 480° F. for 24 hours. The properties of the elastomer so producer (Elastomer A) were measured and are shown below along with those of an elastomer (Elastomer B) produced from a conventional dimethylpolysiloxane gum by the same process.

| Property | Elastomer A | Elastomer B |
| --- | --- | --- |
| Tensile Strength (p.s.i) | 900 | 790 |
| Elongation (percent) | 240 | 220 |
| Linear Shrinkage (percent) | 5.8 | 6.0 |
| Weight loss when heated at 480° F. for 24 hours (percent) | 7.9 | 8.2 |

What is claimed is:

1. A process for producing bis(heptahydrocarboncyclotetrasiloxanyl)oxides which comprises forming a mixture of a heptahydrocarbonhydroxycyclotetrasiloxane and a heptahydrocarbonhalocyclotetrasiloxane and maintaining the mixture at a temperature at which the heptahydrocarbonhydroxycyclotetrasiloxane and the heptahydrocarbonhalocyclotetrasiloxane react to produce a bis(heptahydrocarboncyclotetrasiloxanyl)oxide.

2. A process for producing bis(heptahydrocarboncyclotetrasiloxanyl)oxides which comprises forming a mixture of (a) a heptahydrocarbonhydroxycyclotetrasiloxane, (b) a heptahydrocarbonhalocyclotetrasiloxane and (c) a solvent selected from the group consisting of carbon tetrachloride, benzene, toluene and chloroform, to produce a solution and maintaining the solution at a temperature from 0° C. to 100° C. to cause the heptahydrocarbonhydroxycyclotetrasiloxane and the heptahydrocarbonhalocyclotetrasiloxane to react to produce a bis(heptahydrocarboncyclotetrasiloxanyl)oxide.

3. A process for producing bis(heptamethylcyclotetrasiloxanyl)oxide which comprises forming a mixture of heptamethylhydroxycyclotetrasiloxane and a heptamethylhalocyclotetrasiloxane and maintaining the mixture at a temperature at which the heptamethylhydroxycyclotetrasiloxane and the heptamethylhalocyclotetrasiloxane react to produce bis(heptamethylcyclotetrasiloxanyl)oxide.

4. A process for producing bis(heptamethylcyclotetrasiloxanyl)oxide which comprises forming a mixture of (a) heptamethylhydroxycyclotetrasiloxane, (b) heptamethylhalocyclotetrasiloxane and (c) carbon tetrachloride to produce a solution and maintaining the solution at a temperature from 20° C. to 40° C. to cause the heptamethylhydroxycyclotetrasiloxane and the heptamethylhalocyclotetrasiloxane to react to produce bis(heptamethylcyclotetrasiloxanyl)oxide.

5. The process of claim 4 wherein the heptamethylhalocyclotetrasiloxane is heptamethylbromocyclotetrasiloxane.

6. A process for producing bis(heptahydrocarboncyclotetrasiloxanyl)oxides which comprises condensing a heptahydrocarbonhydroxycyclotetrasiloxane.

7. A process for producing bis(heptahydrocarboncyclotetrasiloxanyl)oxides which comprises dissolving a heptahydrocarbonhydroxycyclotetrasiloxane in a solvent selected from the group consisting of toluene and carbon tetrachloride and condensing the heptahydrocarbonhydroxycyclotetrasiloxane so dissolved at a temperature from 35° C. to 100° C.

8. A process for producing bis(heptamethylcyclotetrasiloxanyl)oxide which comprises condensing heptamethylhydroxycyclotetrasiloxane.

9. A process for producing bis(heptamethylcyclotetrasiloxanyl)oxide which comprises dissolving heptamethylhydroxycyclotetrasiloxane in a solvent selected from the group consisting of toluene and carbon tetrachloride and condensing the heptamethylhydroxycyclotetrasiloxane so dissolved at a temperature from 60° C. to 80° C. in the presence of a catalyst selected from the group consisting of potassium hydroxide and potassium dimethylsilanolate.

References Cited in the file of this patent

UNITED STATES PATENTS 2,867,606   Gilbert _____ Jan. 6, 1959

FOREIGN PATENTS 1,134,383   France _____ Dec. 3, 1956

OTHER REFERENCES

McGregor: "Silicones and Their Uses," McGraw-Hill Book Co. Inc., New York, 1954, page 266.

Scott: "Jour. Am. Chem. Soc.," vol. 68 (1946).